United States Patent

Welschholz et al.

[11] Patent Number: 5,769,649
[45] Date of Patent: Jun. 23, 1998

[54] MODULAR ELECTRICAL DEVICE FOR AUTOMOBILES

[75] Inventors: Jörg Welschholz, Herscheid; Lothar Widlitzki, Castrop-Rauxel, both of Germany

[73] Assignee: Leopold Kostal GmbH & Co. KG, Germany

[21] Appl. No.: 488,687

[22] Filed: Jun. 8, 1995

[30] Foreign Application Priority Data

Jun. 17, 1994 [DE] Germany .......................... 44 22 305.6

[51] Int. Cl.[6] .................................................. H01R 35/04
[52] U.S. Cl. ............................................. 439/164; 439/15
[58] Field of Search ............................... 439/15, 164, 27; 307/10

[56] References Cited

U.S. PATENT DOCUMENTS

| | | |
|---|---|---|
| 4,422,699 | 12/1983 | Sakurai et al. . |
| 4,591,228 | 5/1986 | Vasseur ................................... 439/717 |
| 4,850,881 | 7/1989 | Lagier et al. .............................. 439/15 |
| 5,256,075 | 10/1993 | Miyahara et al. ......................... 439/15 |
| 5,450,769 | 9/1995 | Ho et al. .................................. 74/492 |

FOREIGN PATENT DOCUMENTS

| | | |
|---|---|---|
| 0543483 | 8/1992 | European Pat. Off. . |
| 3427588 | 7/1984 | Germany . |
| 4231191 | 9/1992 | Germany . |
| 4235056 | 10/1992 | Germany . |

*Primary Examiner*—Gary F. Paumen
*Assistant Examiner*—Christopher Goins
*Attorney, Agent, or Firm*—Brooks & Kushman P.C.

[57] ABSTRACT

An electrical device is situated around the steering column of a motor vehicle underneath the steering wheel, including at least one steering column switch and one signal transfer device. In order that different components may be combined in different ways to form different units, the steering column switches are attached to the fixed section of the signal transfer device by cooperating male and female members so that a complete assembly module consisting of different and variable elements is created. The complete assembly module is attached to a carrier member by a cooperating male and female member means and/or force fitting fastener. The rotatable section of the signal transfer device is provided with an extension which cooperates with a finger-like element on the turn signal steering column switch in the finished module in order to provide a cancelling function.

27 Claims, 2 Drawing Sheets

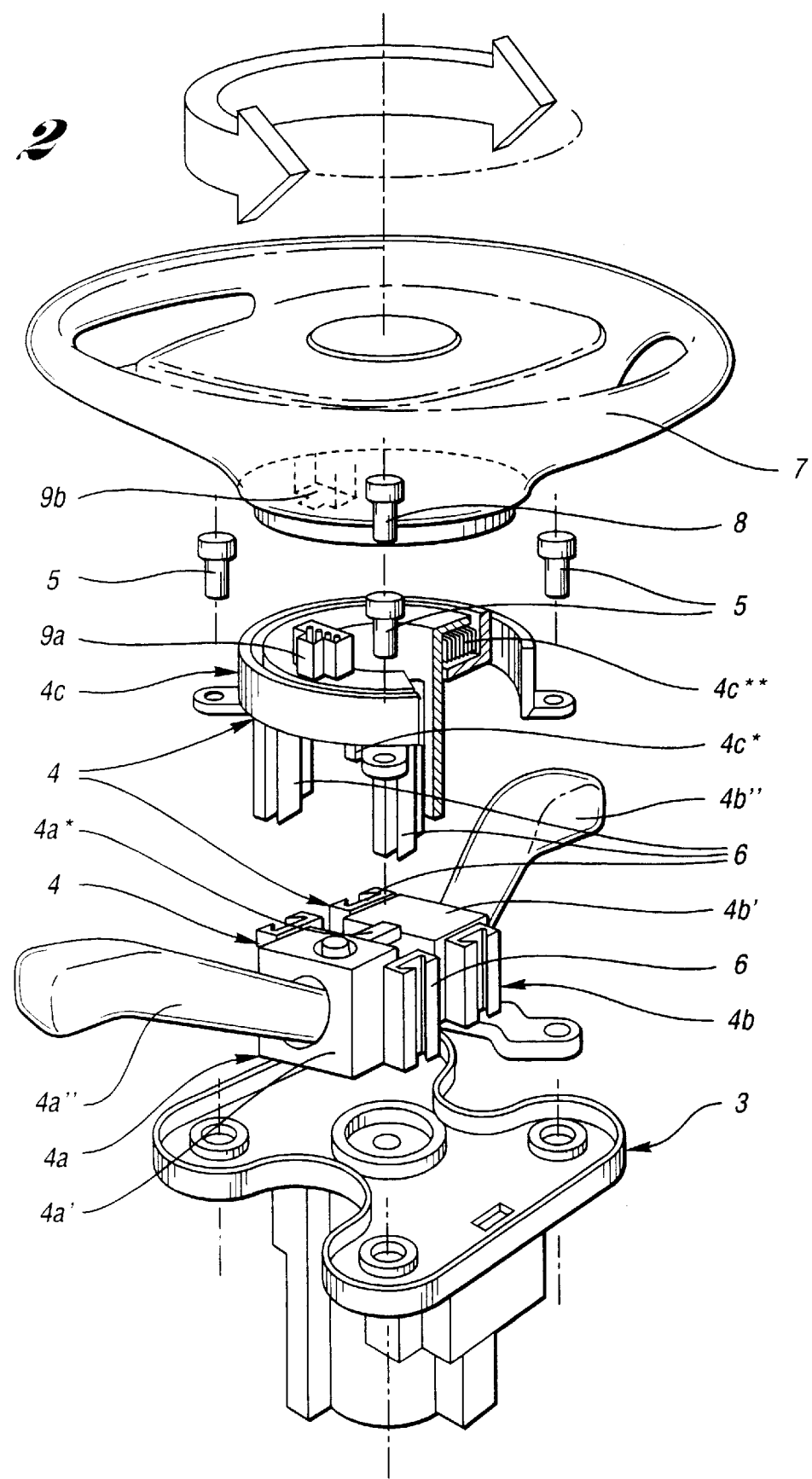

MODULAR ELECTRICAL DEVICE FOR AUTOMOBILES

TECHNICAL FIELD

Invention relates to an electrical device for use in motor vehicles.

BACKGROUND ART

Devices of this type initiate various vehicle functions via the steering column switch or switches—for example, side and headlights, direction indicators, screen washing/wiping. They also transmit various forms of energy using signal transfer means to or from the functional elements which are situated in the steering wheel. For example, the signal transfer means control the air bag and various other functions such as the radio, car phone or the cruise control.

An electrical device was disclosed in U.S. Pat. No. 4,422,699. This device includes two steering column switches, each with a separate housing, which are arranged one above the other and cooperate with a retaining device. The switches are permanently riveted to a spiral roll cassette which acts as a signal transfer device.

Such a device, however, has the disadvantage that because of the fixed and permanent connections, the vehicle manufacturer must supply and stock a large number of differently equipped electrical devices in order to fit the various vehicle models and to satisfy the various requirements of the vehicle purchasers. Sufficient samples of each different electrical device must also be held in stock, giving rise to not inconsiderable expense.

SUMMARY OF INVENTION

It is, therefore, the aim of the present invention to develop further a device so that a larger number of differently equipped variants can be made simply available. A further aim is to provide a device which may be simply mounted in the motor vehicle.

These aims are realized by providing an electrical device for use in motor vehicles which have at least one steering column switch situated below the steering wheel. The steering wheel is attached to a steering spindle. A steering column switch extends radially outwardly therefrom. A carrier member is firmly fixed to and at least partially surrounds the steering column. A signal transfer device is attached to the steering wheel and concentrically surrounds the steering spindle. The signal transfer device is provided with two housing sections that are rotatable in relationship to one another.

One or more steering motion switches and the signal transfer device are connected by means of cooperating male and female members between a base housing of the steering column switch and the fixed housing portion of the signal transfer device and mechanically combine to form a modular unit.

The modular unit is fixed to the carrier member by cooperating male and female members and/or force-exerting means. The housing portion of the signal transfer device rotates according to movement of the steering wheel. The signal transfer device is provided with a cancelling extension which cooperates with a finger-like cancelling element on the steering column switch in order to provide cancellation of a turn signal.

An advantage of the invention is that the various single modules which make up the complete device can be each tested separately before assembly. The modules can easily be combined to form a final configuration which is in accordance with the requirements of the vehicle customer and which can be easily installed in the vehicle and connected with the steering wheel and associated air bag system.

BRIEF DESCRIPTION OF THE DRAWINGS

FIG. 2 is a more detailed exploded perspective drawing of steering column switches and the associated signal transfer device.

DETAILED DESCRIPTION OF THE INVENTION

Figure 1:
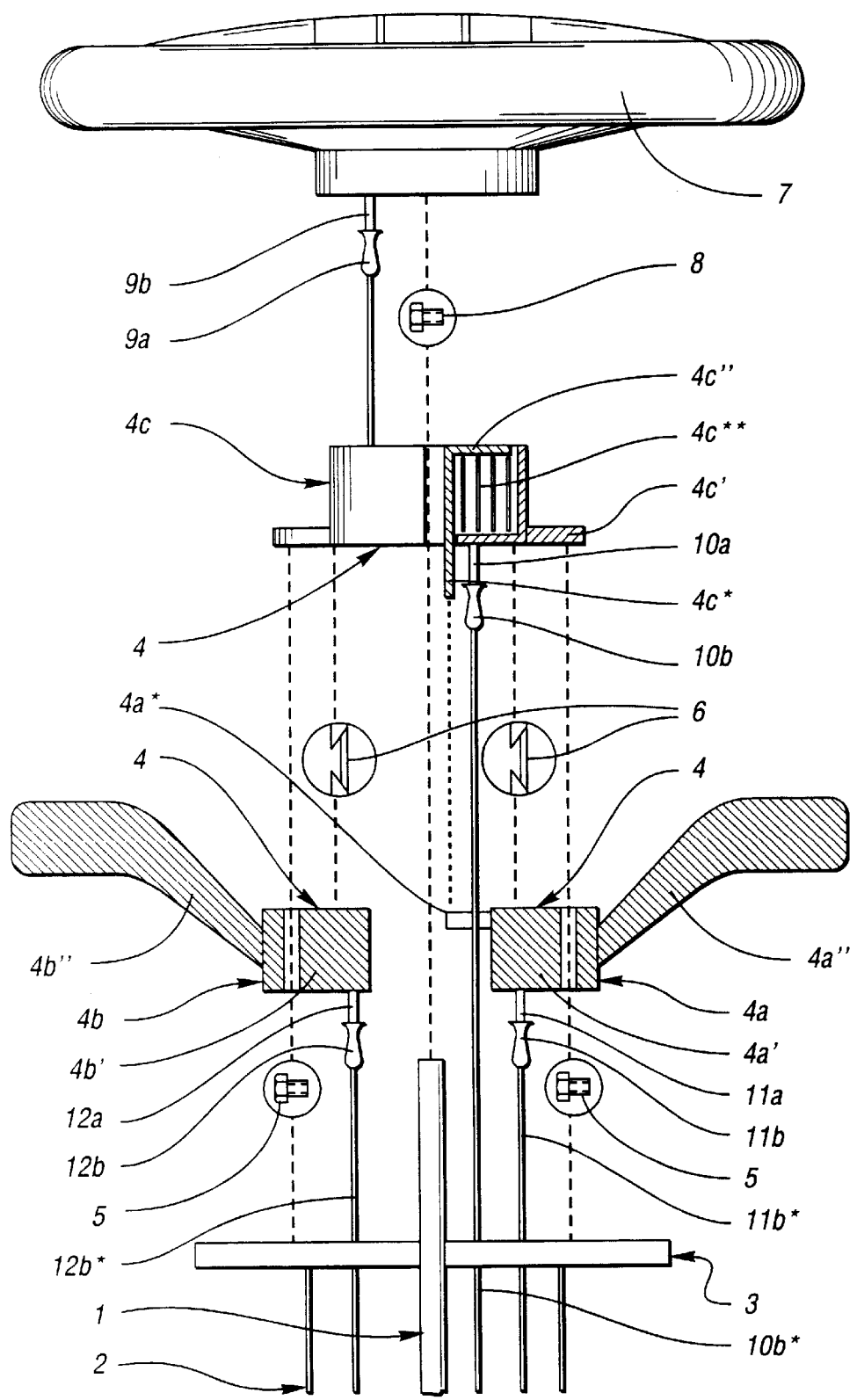
FIG. 1 is an exploded cross-sectional drawing of the electrical device and its relationship to associated components.

In FIG. 1, mechanical connections are shown with dashed lines and functional connections are shown with dotted lines.

As can be seen in the drawings, a retaining device 3 in the form of a carrier plate is fixed to the steering column 2 which surrounds steering shaft 1. A modular unit 4 is fixed to the carrier plate with screwing means 5. The modular unit consists of two steering column switches 4a, 4b which are provided with base housings 4a' and 4b' and switching levers 4a" and 4b" and of a signal transfer device 4c. Steering column switches 4a, 4b and signal transfer device 4c are fitted together by means of swallow-tail connection means 6. This design means that many different variants are possible with regard to components 4a to 4c, allowing various different forms of the components themselves as well as various assembly configurations.

The signal transfer device 4c may be in the form of a spiral roll cassette with electrical or electrical and optical conductors, or it may be supplied with wiper contact or optoelectronic signal transfer means. The device has two housing sections 4c', 4c" which together form a complete housing in the form of a hollow cylinder and are rotatable relative to each other. Housing section 4c', which is the fixed portion when in use, is connected in a separable fashion to steering column switches 4a, 4b. The other, rotatable portion 4c" is attached to the steering wheel by cooperating male and female member means. Steering wheel 7 is in turn attached to steering shaft 1 by means of suitable coded profiles, not shown for the sake of simplicity, and by means of screwing means 8.

Inside steering wheel 7, there is an air bag system, which for the sake of simplicity is likewise not shown. This system, along with other electrical components 7a located in the steering wheel 7, must be supplied with electrical energy. In turn, energy or signals must be supplied by the electrical components to the relevant electrical aggregates or switching systems located in other parts of the vehicle. This energy is transferred by means of the electrical conductors in the clock spring cable 4c** within the spiral roll cassette. These conductors protrude at one end out of rotatable housing section 4c" and terminate in connector elements 9a which are mated with corresponding elements 9b affixed to the ends of the cables allocated to electrical components 7a. At their other end, the conductors protrude from fixed housing section 4c' and terminate in connector elements 10a, which are connected with supply cable 10b* by means of connector elements 10b. Alternatively, connectors 9a and 10a may be attached directly to the spiral cassette housing.

The two steering column switches 4a, 4b are likewise connected with supply cables 11b*, 12c*, by means of connector elements 11a, 12a and 11b, 12b, the supply cables passing through the carrier plate. The supply cables may either be of the metal conductor or glass fibre optic type. The carrier plate may be provided with a PCB, not shown for the sake of simplicity, in which case it would be advantageous to integrate connector elements 11a, 12a, and 10b into this PCB.

In addition, automatic turn signal cancelling is provided in the case of steering column switch 4a by means of a finger-like element 4a* which, when module 4 is assembled, cooperates with a corresponding extension on rotatable housing section 4c" of signal transfer device 4c.

While the best mode for carrying out the invention has been described in detail, those familiar with the art to which this invention relates will recognize various alternative designs and embodiments for practicing the invention as defined by the following claims.

What is claimed is:

1. An electrical device for use in motor vehicles, including at least one steering column switch situated below the steering wheel, the steering wheel being attached to the steering spindle, the steering column switch and base housing extending radially outwardly from the steering spindle; a carrier member which is firmly fixed to, and at least partially surrounds, the steering column; a signal transfer device which is attached to the steering wheel and concentrically surrounds the steering spindle and which is provided with two housing sections rotatable in relationship to one another; wherein the improvement comprises:

a modular unit (4) fixed to the carrier member (3) including:

one or more of the steering column switches (4a/4b) and the signal transfer device (4c), and a direct connection of the base housing (4a', 4b') of the at least one steering column switch to the fixed housing portion (4c') of the signal transfer device comprising at least one discrete keyed in connector;

the housing portion (4c") of the signal transfer device (4c) which rotates according to movement of the steering wheel (7) being provided with a canceling extension (4c*) which cooperates with a finger-like canceling element (4a*) on the associated steering column switch (4a or 4b) in order to provide cancellation of the turn signal.

2. An electrical device according to claim 1, wherein the at least one steering column switch comprises two steering column switches (4a,4b) lying diametrically opposite to one another in relation to the steering spindle (1), the switches being connected with one housing section (4c') of the signal transfer device (4c) at the edge area of the base housing; one of the two steering column switches (4a) being provided with one finger-like cancelling element (4a*).

3. An electrical device according to claim 1, wherein the at least one steering column switch comprises one steering column switch, the switch being connected with one housing section (4c') of the signal transfer device (4c) at the edge area of the base housing; the steering column switch (4a) being provided with a finger-like cancelling element (4a*); and wherein the connection comprises inter-fitting male-female members.

4. An electrical device according to claim 2, two steering column switches (4a,4b) lying diametrically opposite to one another in relation to the steering spindle (1), the switches being connected with one housing section (4c') of the signal transfer device (4c) at the edge area of the base housing; one of the two steering column switches (4a) being provided with one finger-type cancelling element (4a*); and wherein the connection comprises inter-fitting male-female members.

5. An electrical device according to claim 4 wherein one or more of the steering column switches (4a,4b) are connected to one fixed housing section (4c') of the signal transfer device (4c) by means of swallow-tail connecting members.

6. An electrical device according to claim 4, wherein the modular unit (4) is attached by means of screwing elements (5) to the carrier member (3) which is in the form of a plate.

7. An electrical device according to claim 4, wherein the modular unit (4) is attached by means of screwing elements (5) to the carrier member (3) which is in the form of a console associated with steering block.

8. An electrical device according to claim 1, wherein the housing portion (4c") is connected to steering wheel (7) by cooperating male and female member means, the steering wheel being affixed to the steering spindle (1) by cooperating male and female member means and force-exerting screwing means (8).

9. An electrical device according to claim 1, wherein the signal transfer device (4c) is in the form of a clock spring cable cassette (4c**), the two housing sections (4c',4c") being joined so as to form a hollow cylindrical housing.

10. An electrical device according to claim 9, wherein the clock spring cable (4c**) inside the clock spring cable cassette has electrical conductors.

11. An electrical device according to claim 9, wherein the clock spring cable (4c**) inside the clock spring cable cassette has optical and electrical conductors.

12. An electrical device according to claims 1, wherein the signal transfer device (4c) is a rotary brush connector, and the two housing sections (4c',4c") are joined to form a hollow cylindrical housing.

13. An electrical device according to claim 1, wherein the signal transfer device (4c) is provided with optoelectronic components.

14. An electrical device according to claim 1, further including electrical connector elements (9a,10a), the electrical connector elements (9a,10a) positioned on the two housing sections (4c',4c") of the signal transfer device (4c), whereby the connector elements can be mated to corresponding connector elements (9b,10b) respectively associated with the steering wheel (7) and the supply cable (10b*).

15. An electrical device according to claim 14, wherein the supply cable (10b*) is guided through the carrier member (3).

16. An electrical device according to claim 14 wherein the carrier member (3) is provided with electrically conductive tracks.

17. An electrical device according to claim 16, wherein the conductive tracks are connectable by connector elements on the one side with the supply cable, and on the other side with the steering column switches (4a,4b), and the signal transfer device (4c).

18. An electrical device according to claim 16, wherein electrical components are connected to the conductive tracks.

19. An electrical device according to claim 18, wherein the conductive tracks and electrical components are disposed on a printed circuit board.

20. An electrical device according to claim 14, wherein the connector element (10b) associated with the supply cable (10b*) is fixed to the carrier member (3).

21. An electrical device according to claim 14, wherein the connector element (10b) associated with the supply cable (10*b*) and the connector elements 11*a*, 12*a*, associated with the at least one steering column switch are fixed to the carrier member (3).

22. An electrical device according to claim 10 wherein the carrier member (3) is provided with electrically conductive tracks.

23. An electrical device according to claim 11 wherein the carrier member (3) is provided with electrically conductive tracks.

24. An electrical device according to claim 10, wherein the conductive tracks are connected with the supply cable connector elements and/or the connector elements associated with the steering column switches (4*a*,4*b*) and/or the connector elements associated with the signal transfer device (4*c*) by connector elements.

25. An electrical device according to claim 11, wherein the conductive tracks are connected with the supply cable connector elements and/or the connector elements associated with the steering column switches (4*a*,4*b*) and/or the connector elements associated with the signal transfer device (4*c*) by connector elements.

26. An electrical device for use in motor vehicles, including at least one steering column switch situated below the steering wheel, the steering wheel being attached to the steering spindle, the steering column switch in a base housing extending radially outwardly from the steering spindle; a carrier member which is firmly fixed to, and at least partially surrounds, the steering column; a signal transfer device which is attached to the steering wheel and concentrically surrounds the steering spindle and which is provided with two housing sections rotatable in relationship to one another; wherein the improvement comprises:

a modular unit (4) fixed to the carrier member (3) including:

one or more of the steering column switches (4*a*/4*b*) in the signal transfer device (4*c*) wherein the signal transfer device (4*c*) is a rotary brush connector, and the two housing sections (4*c*', 4*c*") are joined to form a hollow cylindrical housing, and a direct connection of the base housing (4*a*', 4*b*') of the at least one steering column switch in the fixed housing portion (4*c*') to the signal transfer device;

the housing portion (4*c*") of the signal transfer device (4*c*) which rotates according to movement of the steering wheel (7) being provided with a cancelling extension (4*c) which cooperates with a finger-like cancelling element (4*a) on the associated steering column switch (4*a* or 4*b*) in order to provide cancellation of the turn signal.

27. An electrical device for use in motor vehicles, including at least one steering column switch situated below the steering wheel, the steering wheel being attached to the steering spindle, the steering column switch in a base housing extending radially outwardly from the steering spindle; a carrier member which is firmly fixed to, and at least partially surrounds, the steering column; a signal transfer device which is attached to the steering wheel and concentrically surrounds the steering spindle and which is provided with two housing sections rotatable in relationship to one another; wherein the improvement comprises:

a modular unit (4) fixed to the carrier member (3) including:

one or more of the steering column switches (4*a*/4*b*) in the signal transfer device (4*c*) wherein the signal transfer device (4*c*) is provided with optoelectronic components;

a direct connection of the base housing (4*a*', 4*b*') of the at least one steering column switch in the fixed housing portion (4*c*') to the signal transfer device;

the housing portion (4*c*") of the signal transfer device (4*c*) which rotates according to movement of the steering wheel (7) being provided with a cancelling extension (4*c) which cooperates with a finger-like cancelling element (4*a) on the associated steering column switch (4*a* or 4*b*) in order to provide cancellation of the turn signal.

\* \* \* \* \*